(No Model.)

J. K. BEACH.
PHOTOGRAPHIC APPARATUS.

No. 319,669.  Patented June 9, 1885.

Witnesses.

John K. Beach
Inventor.
By Atty

UNITED STATES PATENT OFFICE.

JOHN K. BEACH, OF NEW HAVEN, CONNECTICUT.

PHOTOGRAPHIC APPARATUS.

SPECIFICATION forming part of Letters Patent No. 319,669, dated June 9, 1885.

Application filed May 5, 1884. (No model.)

*To all whom it may concern:*

Be it known that I, JOHN K. BEACH, of New Haven, in the county of New Haven and State of Connecticut, have invented a new Improvement in Photographic Apparatus; and I do hereby declare the following, when taken in connection with accompanying drawings and the letters of reference marked thereon, to be a full, clear, and exact description of the same, and which said drawings constitute part of this specification, and represent, in—

Figure 1:
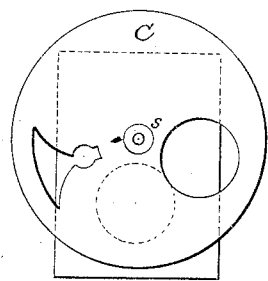
Figure 2:
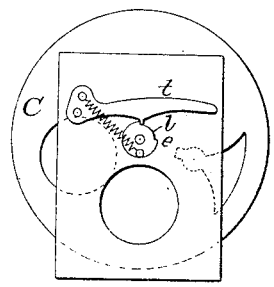
Figure 3:
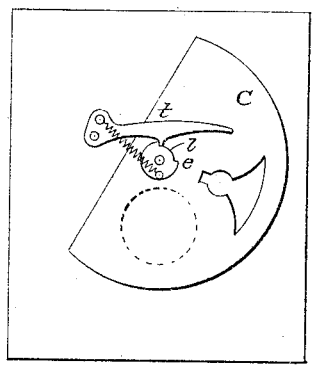
Figure 4:
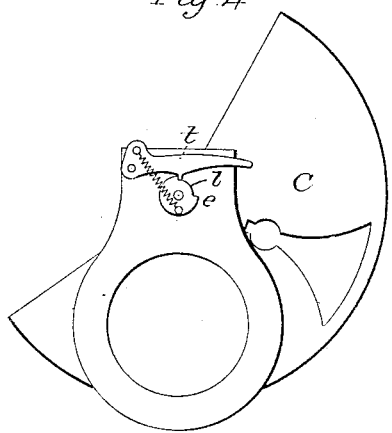
Figure 5:
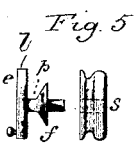

Figure 1, a front view of the disk hung upon its pivot; Fig. 2, a rear view of the same; Figs. 3 and 4, modifications; Fig. 5, a side view of the pivot and its nut detached.

It is well known that photographic plates may be prepared which are so sensitive to light as to require an exposure in the camera of exceedingly short duration. Several devices have been used for giving the necessary quickness of exposure when photographs of moving objects are to be made. Among other contrivances, a slide arranged to travel on ways, and having an orifice which occupies the desired time in passing the lens-aperture; also, an arrangement of two slides traveling in opposite directions, each pierced with an orifice, and which exposes the plate while said orifices are coincident and opposite to the aperture of the lens; also, an arrangement of double flaps or slides, which separate and come together again in front of the lens-aperture, and several arrangements of single flaps not strictly instantaneous in their operation. These arrangements, and all others with which I am acquainted, possess certain disadvantages. In their simplest form they fail to meet the requirements of the laws of optics, and in the attempt to modify them the mechanical requirements of the case are neglected.

The object of my invention is to produce a shutter which will give a correct exposure to the different parts of the plate, and at the same time be so constructed as to be light, quick, and free from vibration, and capable of being arranged in the right position with respect to the lens.

My invention consists of a shutter or disk of opaque material pierced with an orifice for the admission of light to the sensitive plate, and arranged to rotate in an arc over the aperture of the lens under the influence of a spring or other motive power, and a latching mechanism to hold the shutter against such rotation and release it when desired; and also in the arrangement and combination of parts whereby the shutter is made detachable from the operative mechanism; and also in the combination of a shutter having two orifices with a latching mechanism capable of holding the shutter in two positions, whereby the operation of focusing is conveniently accomplished.

The shutter is made of thin material, as light as is consistent with stiffness and opacity— such, for instance, as hard rubber, card-board, or sheet metal. It is shaped as a disk wholly or partly complete in circumference, as shown at C in Figs. 1, 2, 3, and 4, and pierced with an orifice for uncovering the lens-aperture, which orifice is constructed upon lines hereinafter indicated. The shutter is also pierced with a central hole, which slips over the screw-nipple on the pivot $p$, and is held to rotate with said pivot by screwing down upon it a thumb-nut, $s$, which clamps the shutter against the supporting-flange formed on the pivot. The construction of this pivot is shown in detail at Fig. 5. On the front side of the base the pivot is formed with a flange, $f$, counterbored flush with the surface of the base, and from this flange a threaded nipple projects. On the back side of the base the pivot carries a circular piece of metal, $l$, adapted to hold the spring for rotating the shutter and formed to make a latch-connection with the trigger $t$. One end of the spring is fastened to the trigger near its pivot and the other end to the circular latching-disk. By this means a latch-connection is formed which cannot be broken by the force of the mainspring, and since the latching-disk is also formed to act as a guide and support to the trigger against the force of the spring in other positions of the shutter this arrangement is exceedingly compact. The latching-disk is also provided with a reversed notch on the other side of the dead-center, which latches with the trigger and holds the shutter in such position as to leave the lens-aperture open for focusing. For this purpose the disk is formed either with an auxiliary opening, as shown in Fig. 1, or in the shape of an incomplete disk, as shown in Fig. 3.

The operation of the shutter is as follows:

It is first latched in position with its auxiliary orifice opposite the lens-aperture, so as to leave said aperture open for focusing. Proper focus being obtained, the shutter is turned until the latching mechanism holds it in the other position with the lens-aperture covered by the opaque material of the disk. The sensitive plate is then put in place in the camera in the usual manner, and upon releasing the latch the shutter is rotated by the spring and admits light to the sensitive plate through the lens while its orifice is passing the lens-aperture.

The time of exposure depends upon the size and shape of the orifice, the strength of the spring, and the frictional resistance in rotation.

The strength of the spring may be varied by using rubber rings of different sizes, and friction may be lessened by putting thin paper washers over the screw-nipple on the pivot $p$ before the shutter is attached. This construction also makes it possible to free the shutter itself from all the operating mechanism and to confine all that mechanism to the base, whereby any number of shutters may be interchanged without multiplying any of the other parts. Thus results an essential improvement, for no one shutter having a given opening is equally adapted to different subjects. Each one requires a certain distribution of exposure over the parts of the plate in order to produce the best result.

This construction of shutter can be applied to a combination-lens at the proper point—to wit, at a point between the lenses of the combination—as seen at Fig. 4. The stops which limit the diameter of the working aperture of the combination are always inserted between the two lenses for optical reasons, which apply with equal force to the position of the shutter; and when so situated between the lenses and immediately behind the stop the shutter can be made smaller for the same diameter of lens than if placed before or behind the whole combination, and its orifice adjusted with greater accuracy.

When applied to a single lens, a base may be used to support the shutter over the front end of the lens-tube, as shown in Fig. 1; or the shutter may be applied directly to the camera behind the tube, as shown in Fig. 3.

I am aware that it is old to rotate a shutter consisting of a segment or segments of circles in front of a lens-aperture, and make no claim, broadly, to such construction. My improved shutter differs from others of which I am aware in that the shutter is provided with a latching-disk of less diameter than the shutter itself, and with a rotating pivot to which the motive power of the spring is applied instead of directly to the shutter. The said shutter is arranged upon one side of the plate, which supports the rotating and latching mechanism upon its opposite side.

I claim—

1. In a photographic apparatus, the combination of a flanged rotating pivot, mechanism, substantially such as described, to impart rotation to said pivot, latching-disk $l$, of less diameter than the shutter, a shutter constructed with an orifice for exposing the plate and attached to said pivot so as to partake of its rotation, and whereby the aperture in the said shutter is caused to cross the lens-aperture, substantially as and for the purpose specified.

2. The combination of the latching-disk $l$, trigger $t$, and a spring connecting said disk and trigger, substantially as described.

3. In a photographic apparatus, the combination of a stationary plate, rotating shutter C, arranged upon one side of the plate and provided with a pivot, $p$, extending through the said plate and so as to rotate with the shutter, and a shutter latching and rotating device upon the reverse side of the plate, substantially as described.

JOHN K. BEACH.

Witnesses:
 Jos. C. EARLE,
 J. H. SHUMWAY.